United States Patent [19]

Rundle

[11] Patent Number: 4,611,504
[45] Date of Patent: Sep. 16, 1986

[54] GARDEN TRACTOR TRANSAXLE WITH PLANETARY DIFFERENTIAL INPUT

[76] Inventor: Kenneth P. Rundle, 8304 Brookside Rd., Independence, Ohio 44131

[21] Appl. No.: 628,204

[22] Filed: Jul. 5, 1984

[51] Int. Cl.[4] .............................................. F16H 37/08
[52] U.S. Cl. ...................................... 74/695; 74/342; 74/363; 74/713
[58] Field of Search ................. 74/342, 344, 362, 363, 74/366, 373, 374, 375, 695, 700, 701, 710, 713

[56] References Cited

U.S. PATENT DOCUMENTS

| | | | |
|---|---|---|---|
| 2,110,180 | 3/1938 | Semery | 74/363 |
| 2,808,738 | 10/1957 | Bartell | 74/695 X |
| 2,947,189 | 8/1960 | Foster et al. | 74/342 |
| 3,029,662 | 4/1962 | Hause | 74/695 |
| 3,159,044 | 12/1964 | Feuillastre | 74/375 X |
| 4,095,675 | 6/1978 | Bell | 74/695 X |
| 4,223,569 | 9/1980 | Koivunen et al. | 74/695 X |
| 4,224,839 | 9/1980 | von Kaler | 74/713 X |
| 4,227,427 | 10/1980 | Dick | 74/710 X |
| 4,287,791 | 9/1981 | Numazawa et al. | 74/701 |
| 4,515,038 | 5/1985 | Tsuboi | 74/333 X |

FOREIGN PATENT DOCUMENTS 2036208  6/1980  United Kingdom .................. 74/363

Primary Examiner—Kenneth J. Dorner
Assistant Examiner—Dwight G. Diehl

[57] ABSTRACT

A transaxle especially for use with small tractors, power equipment and the like wherein a range transmission is incorporated within a speed transmission to provide a unique drive that provides three forward and one reverse normal speed drives and two or three forward creep speed drives of extreme reduction ratio. Also shown, in variation, is a planetary epicyclic gear train that replaces the reverting gear trains currently employed in these transaxles to provide for more compact and economical construction. In one variation a friction drive clutch is contained within the transaxle receiving an input from a primary reduction gear and providing an input to the speed transmission mainshaft.

2 Claims, 8 Drawing Figures

GARDEN TRACTOR TRANSAXLE WITH PLANETARY DIFFERENTIAL INPUT

BACKGROUND OF THE INVENTION

A conventional lawn tractor transaxle combines a primary reduction input, a selective speed transmission, a reverting gear reduction train, a differential with output axles to carry the tractor drive wheels and occasionally a range transmission in one housing.

Currently some lawn tractors are being fitted with work attachments such as counter-rotating tillers and wide snow blowers. The new transaxle provides "super creep speeds" to enhance the performance of tractors so fitted.

Recently a tractor manufacturer has shown interest in a hybrid tractor design that combines lawn tractor and large garden tractor technologies. The new invention shows, in variation, a transaxle-clutch combination to receive a direct shaft input from an in-line mounted horizontal shaft engine to be economically incorporated within these tractors so as to simplify construction and provide for a "live" rear PTO drive source.

Presently the market demands small tractors that will perform satisfactorily with the above named attachments and provide speed shifting conveniences without appreciable cost increases. In variation, the new transaxle makes available, to the tractor operator, the normal reverse and one normal forward speed without shifting from the low speed range.

The new transaxle can be manufactured at reduced cost since it employs fewer components, as many serve multiple functions. Also, a very compact unit is possible as available shaft space is fully exploited with correspondingly reduced shaft deflections.

SUMMARY OF THE INVENTION

A primary object of the invention is to show an integral speed and range transmission that economically provides a very wide range of speeds while utilizing a minimum number of components with all cogged drive elements being of considerable pitch diameter to assure mechanical integrity.

A main object of the invention is to provide a unique speed transmission with an integral range transmission that makes the normal reverse speed available without requiring a shift from the low speed range.

Another main object of the invention is to show a compact axle differential drive that provides increased mechanical reduction to reduce the required V belt reduction and/or more costly gear reductions currently employed in small tractors.

Yet another main object of the invention is to show a differential drive that provides increased mechanical reduction while allowing the differential, axles, and transmission output shaft to be disposed coaxially in a more compact transaxle.

A further object of the invention is to show a unique speed transmission with an integral range transmission that makes the normal reverse and one normal forward speed available without requiring a shift from the low speed range.

Also, an object of the invention is to provide an economical transaxle-clutch combination in one housing.

BRIEF DESCRIPTION OF THE DRAWINGS

The invention will be described by way of example, with reference to the accompanying drawings, in which FIGS. 1, 2, 3, 6, 8 are section top views along a horizontal cutting plane through the centerline of the transaxles in which:

FIG. 1 represents a top input transverse five speed yard tractor transaxle that employs simple planetary epicyclic differential drive.

FIGS. 2 and 3 represent a shaft input transverse six speed garden tractor transaxle that employs double reduction final drive.

FIG. 6 represents a disc clutch to be optionally fitted within the transaxle of FIGS. 2, 3.

FIG. 8 represents a compound planetary epicyclic driven differential carrier to be optionally fitted into the transaxle of FIG. 1.

DESCRIPTION OF DRAWING ONE

Figure 1:
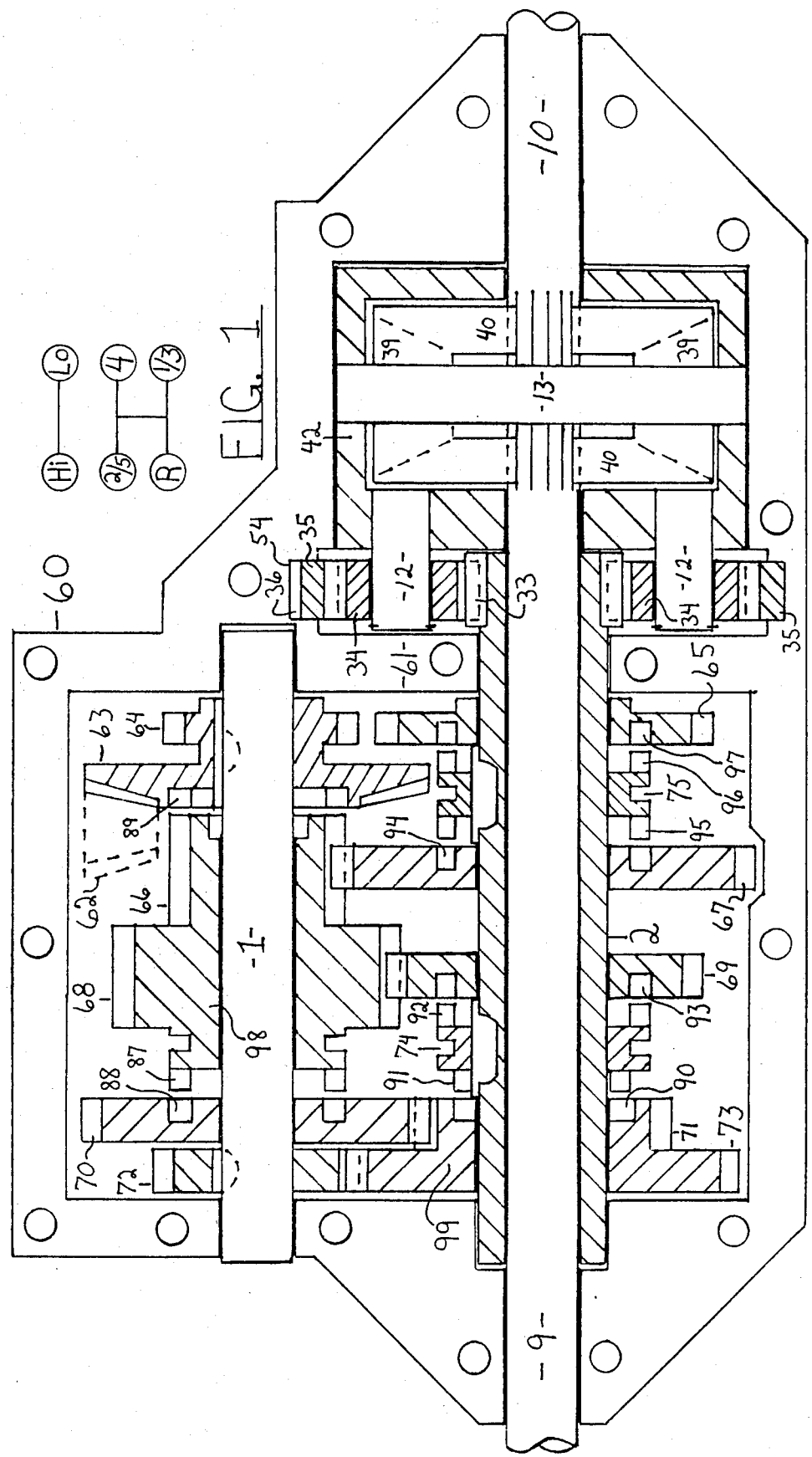

Referring to FIG. 1. This transverse, vertical input, five speed, lawn tractor transaxle comprises a lower case 60 and an upper cover (not shown) joined together with machine bolts in a conventional manner at a horizontal parting plane that bisects the centers of mainshaft 1 and axle shafts 9, 10 thus providing the entire support and enclosure housing.

Power from the engine is clutched and passed via belt drive to a conventional input shaft (not shown) protruding vertically outside and journalled in the top cover. This input shaft ends with an integral bevel pinion (represented at 62, rotated 90° from true location) inside the housing in mesh with bevel gear 63 keyed and fixed to mainshaft 1 journalled in the housing.

Bevel gear 63 is integral with reverse drive sprocket 64 that drives reverse driven sprocket 65 rotatable on countershaft 2 with a silent chain (not shown). Fourth pinion 72 keyed and fixed on mainshaft 1 drive fourth gear 73 rotatable with integral low pinion 71 on countershaft 2. Low pinion 71 drives low gear 70 rotatable on mainshaft 1. Mainshaft cluster 98 is rotatable and free to slide axially on mainshaft 1 when motivated by a shift fork. When cluster 98 is moved to the right, pinion 66 engages internal gear aperture 89 in bevel gear 63 to be effectively locked to mainshaft 1 to provide the three normal or "hi" range speeds. When cluster 98 is moved to the left, pins 87 engage holes 88 in low gear 70 to be driven at a lower speed than mainshaft 1 to provide the two "creep" or "low" range speeds.

First and third pinion 66 drives first and third gear 67 rotatable on countershaft 2. Second and fifth pinion 68 drives second and fifth gear 69 rotatable on countershaft 2.

Axle shaft 9 passes coaxially within hollow countershaft 2. Countershaft 2 is journalled in the housing center wall 61 and left end wall ending with overhung sun gear 33. Internal ring gear 35 is secured in a cavity of the housing with lug 36 fitted into aperture 54 to prevent rotation.

Differential carrier 42 is journalled in a cavity in the housing and has fixedly anchored three planet pins 12. Rotatably mounted on planet pins 12 and meshing with sun gear 33 and internal ring gear 35 are three planet gears 34 to form a planetary epicyclic train to pass the drive from countershaft 2 to differential carrier 42. Spider pin 13 is anchored in carrier 42 and carries rotatable spider gears (represented at 39) in mesh with side gears (represented at 40) spline mounted on axle shafts 9, 10. Axle shafts 9, 10 are journalled in the housing at their outward ends and in carrier 42 at their inner ends protruding from the housing to carry the tractor drive wheels.

Shift collars 74, 75 are keyed to countershaft 2 and moved axially by separate shift forks. When collar 74 is moved to the left, dogs 91 engage dogs 90 of cluster 99 establishing a fourth speed drive. When collar 74 is moved to the right, pins 92 engage holes 93 of second and fifth gear 69 establishing second and fifth speed drives (as determined by the range selection). When collar 75 is moved to the right, pins 96 engage holes 97 in reverse driven sprocket 65 establishing a reverse speed drive. When collar 75 is moved to the left, pins 95 engage holes 94 of first and third gear 67 establishing first and third speed drives (as determined by the range selection.)

The shift forks and linkages are of a conventional design carried by the upper cover and being controlled by movement of two gearshift levers in the popular in-line and "H" patterns shown.

The speed transmission employed in this transaxle provides every required speed from 0.5 to 5 mph without redundancy or compromise. The operator has readily available the "normal" reverse and a practical "normal" forward speed while operating in the "creep" range thus eliminated are the frustrations normally associated with two lever, two range transmissions.

Simplicity, large pinions, conservative reduction ratios and constant meshing allow for very modest manufacturing cost with powdered metal components compatible with high torque applications.

DESCRIPTION OF DRAWINGS TWO AND THREE THE PREFERRED EMBODIMENT

Figure 2:
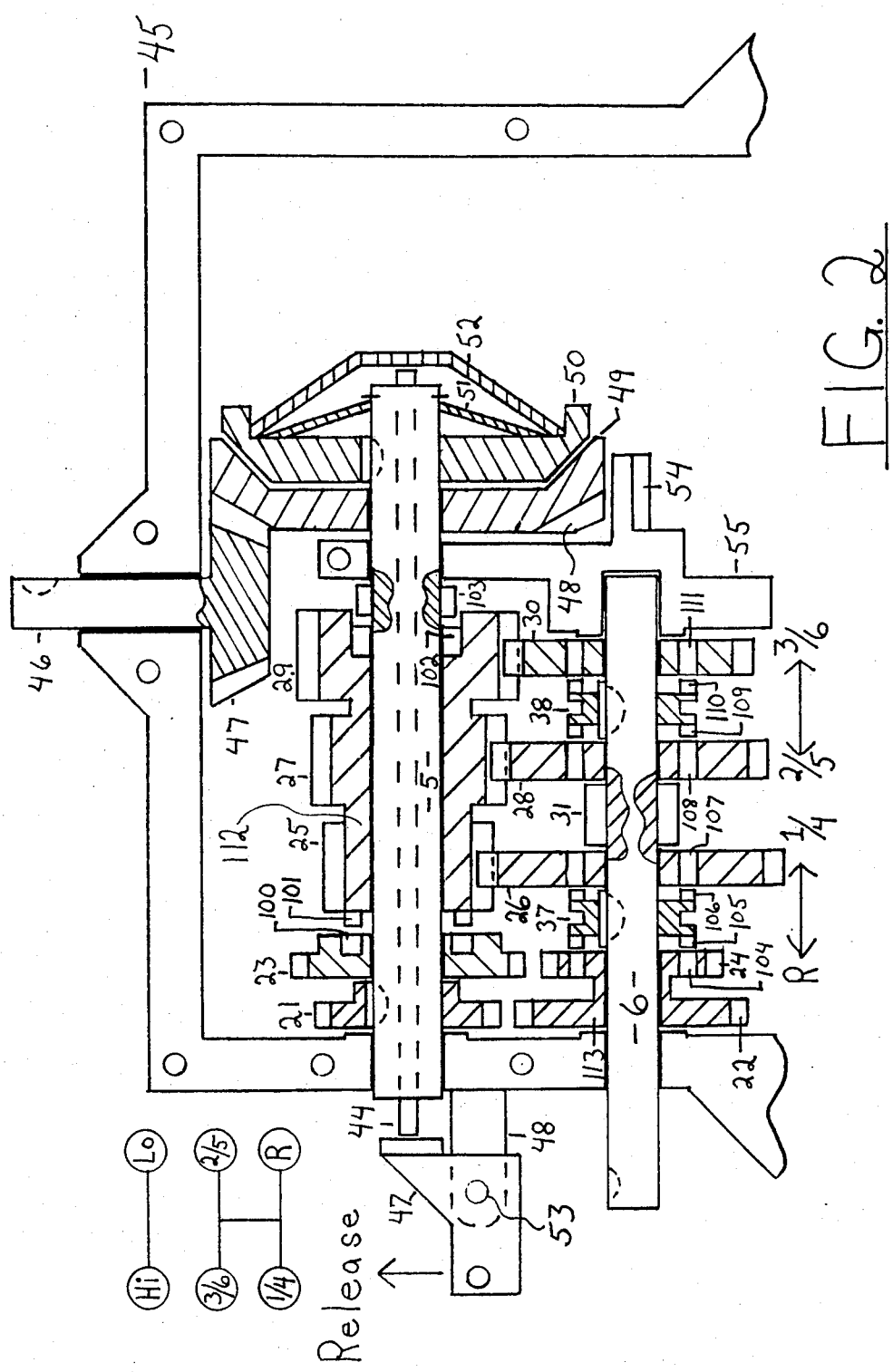
Figure 3:
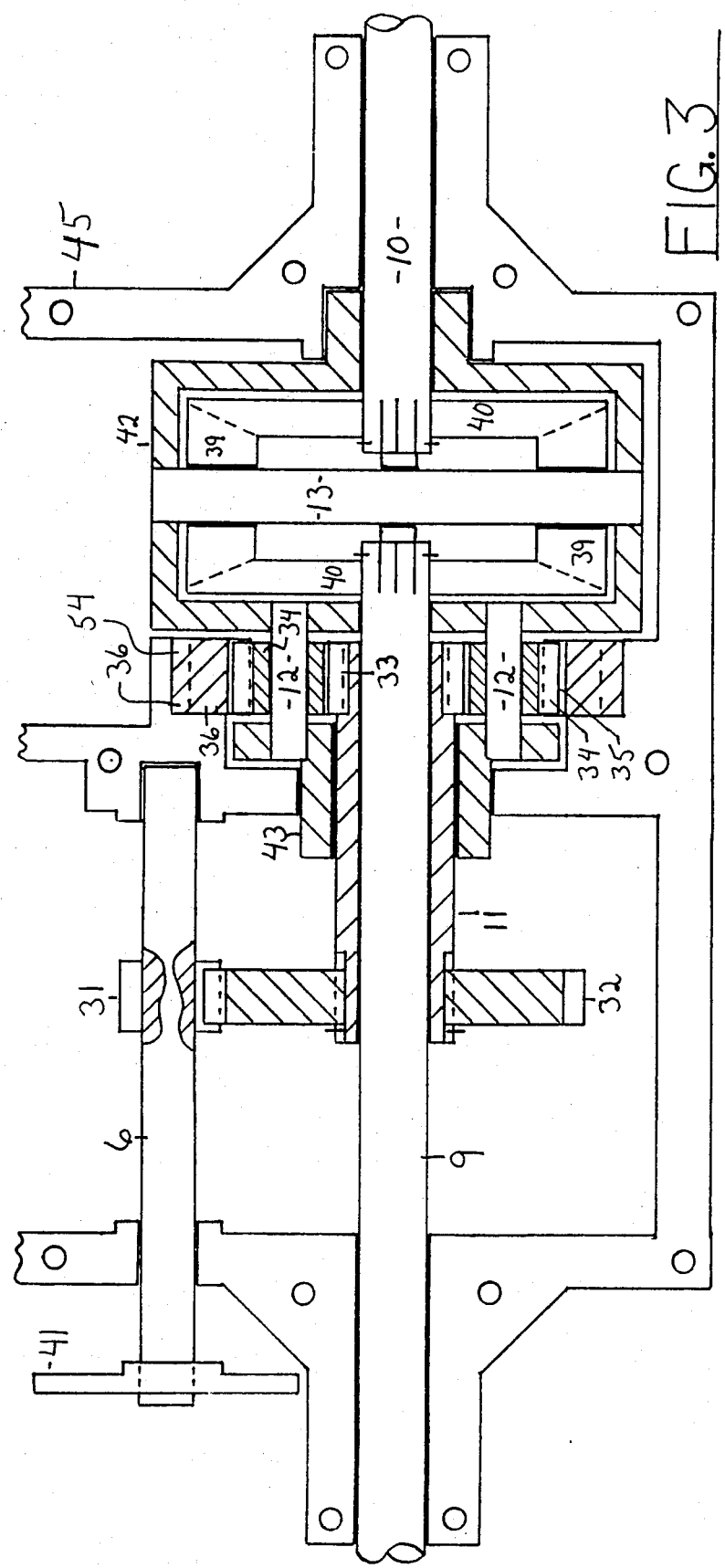

Referring to FIGS. 2 and 3 primarily. The transverse, shaft input, six speed, yard tractor transaxle includes the tractor drive clutch integrally and comprises a lower case 45 and an upper cover (not shown) joined together with machine bolts in a conventional manner at a horizontal parting plane that bisects the centers of all shafts thus providing the entire support and enclosure housing.

Direct power from the engine is shaft supplied to input shaft 46 journalled in the housing ending with an integral bevel pinion 47 inside. Bevel gear 48, rotatable on mainshaft 5, and in mesh with bevel pinion 47 has integral cone clutch driving member 49. Mainshaft 5 is journalled in housing left end wall and support wall 55 and carries axially free keyed cone clutch driven member 50. Driven member 50 is forced in contact with driving member 49 by bellville spring 51 positioned on mainshaft 5 by a snap ring. Driven member 50 has a greater inside diameter cavity in which release cover 52 is secured by a snap ring. Clutch release rod 44 passes axially through hollow mainshaft 5. The housing upper cover and lower case 45 have integral pivot bases 48 to which clutch release bellcrank 47 is secured by pin 53. When release bell-crank 47 is moved forward by a clutch pedal and linkage, release rod 44 pushes release cover 52 to pull driven member 50 away from driving member 49 and thus interrupt the drive from the engine to mainshaft 5.

Reverse driver sprocket 21 keyed to mainshaft 5 drives reverse driven sprocket 22 rotatable in cluster with low driver sprocket 24 with a silent shain (not shown). Low driver sprocket 24 drives low driven sprocket 23 rotatable on mainshaft 5 with a second silent chain (not shown).

Mainshaft cluster 112 is rotatable and free to slide axially on mainshaft 1 when motivated by a shift fork. When cluster 112 is moved to the right, dogged aperture 102 engages mainshaft integral drive lugs 103 to provide for the three normal or "hi" range speeds. When cluster 112 is moved to the left, pins 101 engage holes 100 in low driven sprocket 23 to be driven at a lower speed than mainshaft 5 to provide for the three "creep" or "low" range speeds.

First and fourth pinion 25 drives first and fourth gear 26 rotatable on countershaft 6. Second and fifth pinion 27 drives second and fifth gear 28 rotatable on countershaft 6. Third and sixth pinion 29 drives third and sixth gear 30 rotatable on countershaft 6.

Countershaft 6 is journalled in the housing center wall 55 and left end wall with integral transfer pinion 31 and keyed outside brake rotor 41.

Shift collars 37, 38 are keyed to countershaft 6 and moved axially by separate shift forks.

When collar 37 is moved to the left, pins 105 engage holes 104 of cluster 113 establishing a reverse speed drive. When collar 36 is moved to the right, pins 106 engage holes 107 of first and fourth gear 26 establishing first and fourth speed drives (as determined by the range selection).

When collar 38 is moved to the left, pins 109 engage holes 108 of second and fifth gear 28 establishing second and fifth speed drives (as determined by the range selection). When collar 38 is moved to the right, pins 110 engage holes 111 of third and sixth gear 30 establishing third and sixth speed drives (as determined by the range of selection).

The shift forks and means are of a conventional design carried by the upper cover and being controlled by movement of two gearshift levers in the popular in-line and "H" patterns shown.

Figure 7:
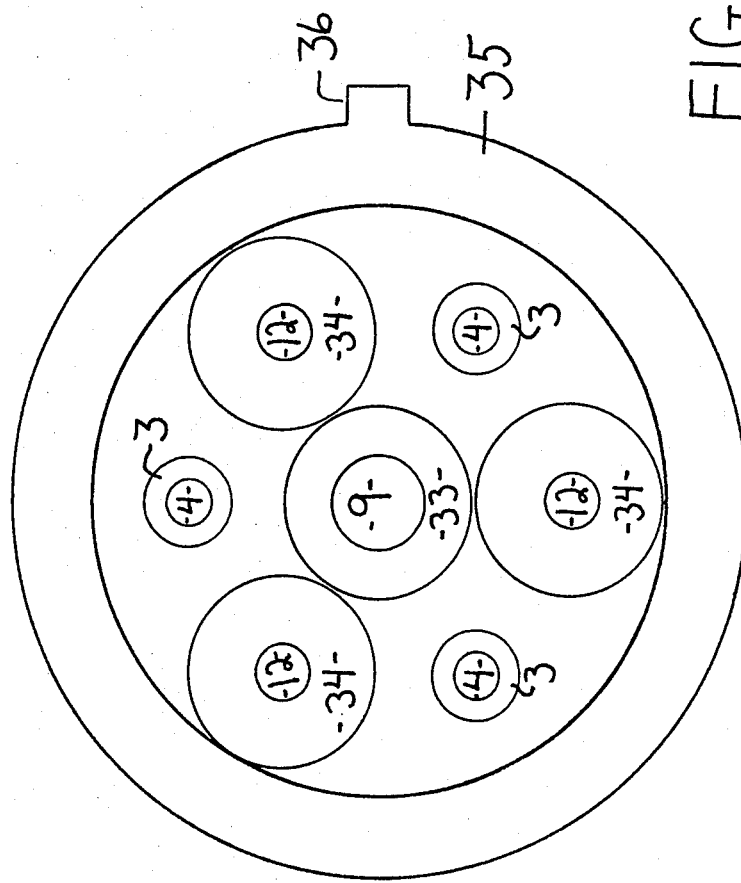
FIG. 7 is a schematic representation of the differential drive and carrier assembly of the transaxle of FIGS. 2, 3.

Differential carrier 42 is journalled on the left directly in the housing. A removable left journal 43 is journalled in the housing and attached to carrier 42 by three pressed planet pins 12 and additionally by countersunk machine bolts and spacers as shown in FIG. 7.

Axle shafts 9, 10 are journalled at their outward ends in the housing and at their inner ends in carrier 42 and extend from the housing to carry the tractor drive wheels.

A sun shaft 11 and integral sun gear 33, rotatable on axle shaft 9, are driven by spline mounted transfer gear 32 in mesh with transfer pinion 31. Internal ring gear 35 is secured in a cavity of the housing and locked from rotation by lug 36 in aperture 54. Three planet gears 34 rotatable on planet pins 12 and in mesh with sun gear 33 and ring gear 35 complete a planetary epicyclic train to pass the drive to differential carrier 42.

Spider pin 13 is anchored in carrier 42 and carries rotatable spider gears (represented at 39) in mesh with side gears (represented at 40) spline mounted on axle shafts 9, 10.

The illustration shows a transmission readily capable of providing a travel speed range of 0.5 to 5 mph while utilizing a very minimum of components. No overdrive ratios are employed and the largest single reduction ratio is 2.5:1 while the chain drives require only 2:1 reduction. The large pinions and constant mesh design will allow utilization of powdered metal technology in high torque applications.

Conservative overdrive ratios for the highest speed will expand the speed range greatly and eight speed and in line shifting models are available.

DESCRIPTION OF DRAWINGS FOUR, FIVE AND SIX

Figure 4:
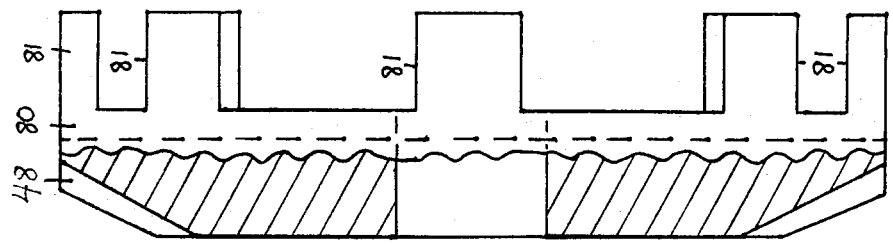
FIG. 4 represents a partial section side view of the input bevel gear and clutch cup of the clutch of FIG. 6.
Figure 6:
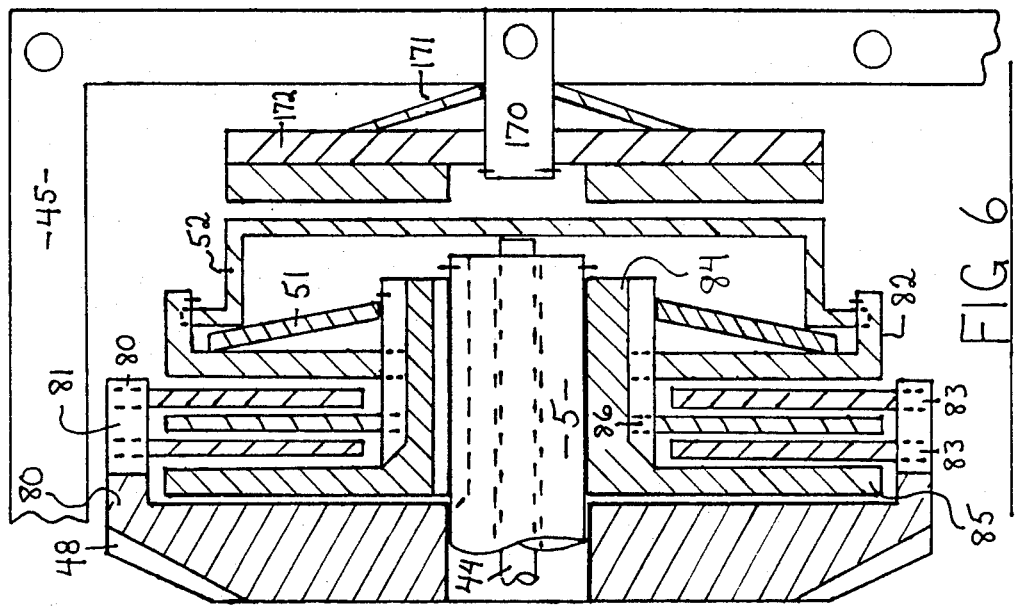
Figure 5:
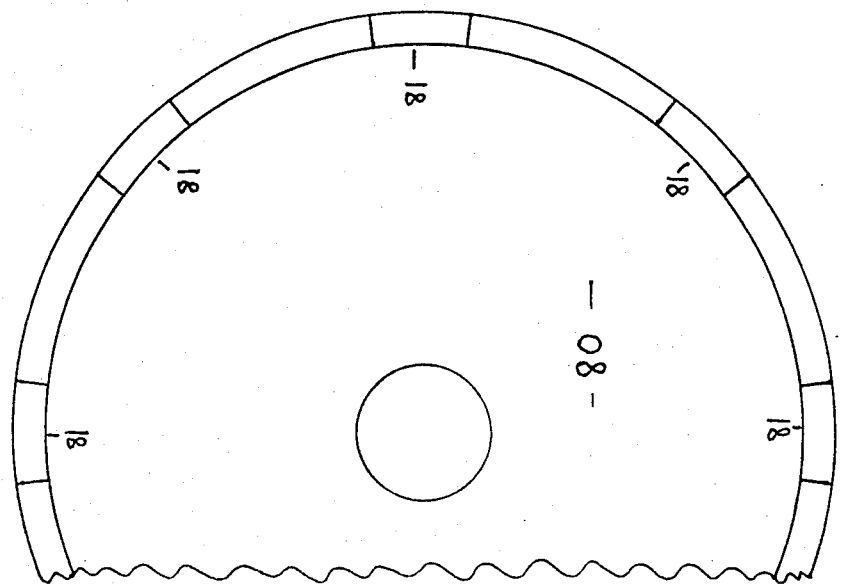
FIG. 5 represents a partial right side view into the clutch cup of FIG. 4 showing the spacing of the drive lugs.

Referring to FIGS. 4, 5, and 6 primarily.

This multi plate disc clutch with clutch brake can be optionally fitted within the transaxle of FIGS. 2 and 3 in place of the shown cone clutch.

Bevel gear 48 has an integral clutch input cup 80 with lugs 81 driving two friction discs 83. Clutch hub 84 keyed and fixed on mainshaft 5 has integral back plate 85 and a coarse spline to carry nonrotatable steel disc 86 and pressure plate 82 both free to slide axially.

A bellville spring 51, carried on hub 84 and secured by a snap ring, forces pressure plate 82 toward back plate 85 compressing the three slidable discs and effecting a drive from bevel 48 to mainshaft 5.

Pressure plate 82 has a greater inside diameter serrated to drive and retain, with snap ring, release cover 52. Release rod 44, motivated as described in FIGS. 2 and 3, acts on cover 52 to pull pressure plate 82 away from back plate 85 and thus release the clutch.

A clutch brake, to provide positive disengagement, utilizes release cover 52 as a rotor. Friction brake disc 172 is mounted nonrotatably on a square shaft 170 cast integrally with housing case 45 and is "loaded" by bellville spring 171 and snap ring retained.

Release rod 44 motivated further causes cover 52 to contact brake disc 172 with spring 171 limiting the applied force and allowing full clutch separation and unobstructed service brake action as a single foot pedal usually controls both the clutch and service brake.

DESCRIPTION OF DRAWING SEVEN

Referring to FIG. 7 primarily.

This schematic representation of the simple planetary epicyclic train of the transaxles disclosed shows lug 36 that prevents rotation of ring gear 35. Also shown are the spacers 3 and machine bolts 4 that attach the left differential carrier journal 43 of FIG. 3 to differential carrier 42.

DESCRIPTION OF DRAWING EIGHT

Figure 8:
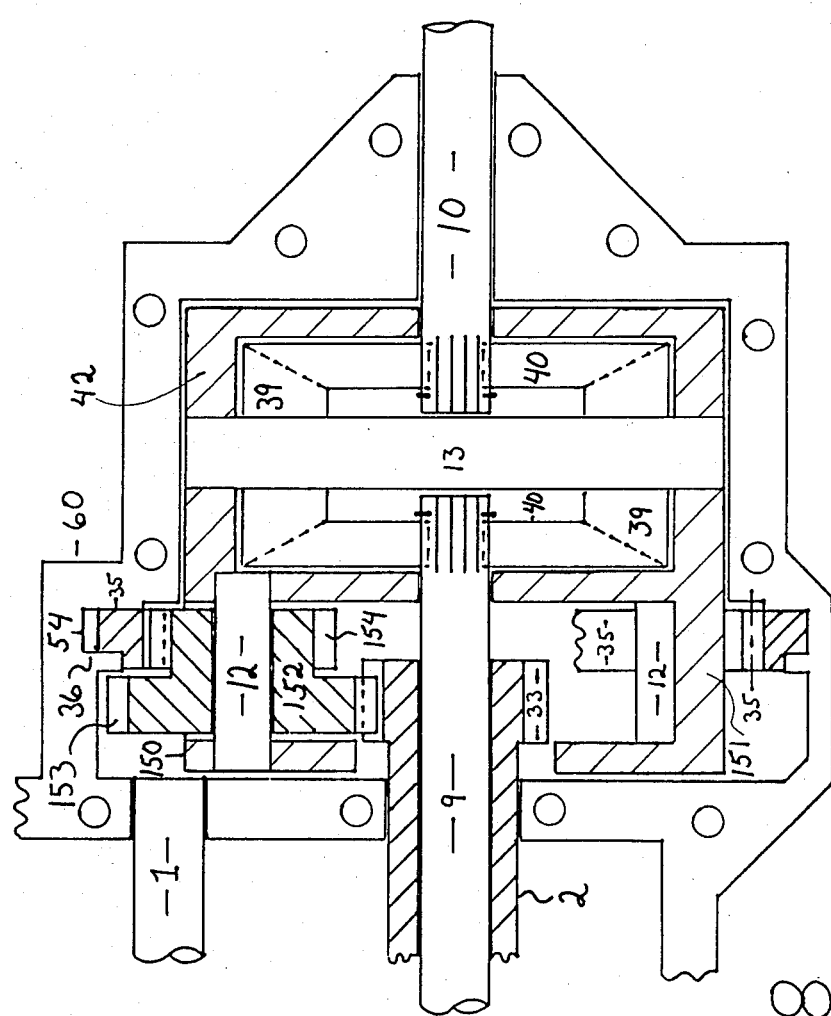

Referring to FIG. 8 primarily.

This compound planetary epicyclic driven axle differential section can be substituted in place of the simple planetary epicyclic driven axle differential section of FIG. 1 to provide further increased speed reduction as may be required. For clarity, only one of three planet clusters 152 are shown and some background lines are omitted.

Carrier assembly 42 now includes an integral outer planet support 150 joined to carrier 42 by three spokes 151 located between the three planet clusters 152 made up of a larger planet 153 and a smaller planet 154. Planet 153 meshes with and is driven by sun 33. Planet 154 driven by planet 153 meshes with fixed ring gear 35 located in a cast cavity in housing case 60 with rotation prevented by housing aperture 54's capture of ring gear lug 36. Planet clusters 152 are rotatably mounted on planet pins 12 press fit into carrier 42 and cause carrier 42 to rotate by the epicyclic action of the rotating planets as they "walk" around ring gear 35.

Carrier 42 drives spider pin 13, rotatable spider gears 39 and side gears 40 spline fit to axle shafts 9, 10 in the manner of a conventional automotive differential.

The extra speed reduction afforded by this compound planetary differential drive reduces needed reduction elsewhere in the tractor drive typified by V belt reduction.

It will now be seen that the invention provides advanced transaxles of uncompromised design integrity that afford a very wide range of speeds and increased overall gear reduction, while promoting compactness convenience, efficiency and affordability.

The speed transmission and differential drives disclosed will find applications in many fields by those skilled in the art within the scope of this invention and while there have been described above the principles of this invention in connection with specific apparatus, it is to be clearly understood that this description is only by way of examples and not as a limitation to the scope of the invention.

I claim:

1. In a transaxle (FIGS. 1 and 2): a housing, a mainshaft and a countershaft parallel thereto journalled in said housing, a plurality of toothed driving sets on said shafts for establishing a plurality of drives at respective ratios between said shafts comprised of, a first toothed driving element nonrotatable on said mainshaft, driving constantly a first toothed driven element rotatable on said countershaft, and a second toothed driving element rotatable in cluster with said first toothed driven element on said countershaft, said second toothed driving element constantly driving a second toothed driven element rotatable on said mainshaft, and a second cluster rotatable on said mainshaft having at least a third and a fourth toothed driving element drivingly connected constantly to at least a third and a fourth toothed driven element rotatable on said countershaft, first selective shift means to drivingly connect only one at a time said first, third and fourth toothed driven elements to said countershaft, second selective shift means to drivingly connect said second cluster to said mainshaft and to said second toothed driven element only one at a time, said transaxle being further comprised of a differential in said housing having an input carrier member, gear means to drivingly connect said input carrier and said countershaft, said differential having a pair of coaxial output axle shafts leaving said housing to drive tractive members.

2. In a transaxle (FIG. 1): a housing, a mainshaft and a hollow countershaft parallel thereto journalled in said housing, a plurality of sets of toothed driving elements on said shafts for establishing a plurality of drives at respective ratios between said shafts comprised of, a plurality of toothed drivers on and drivingly connected to said mainshaft, and a plurality of toothed driven members rotatable on said countershaft and engaged with said toothed drivers, said transaxle further comprised of clutch means disposed on said countershaft shiftable to drivingly connect said toothed driven members to said countershaft only one at a time to establish the desired line of drive, and a differential journalled in said housing having an input carrier and a pair of coaxial output axle shafts rotatable on an axis parallel to said mainshaft, said countershaft being disposed coaxial about one said axle shaft, an improvement in the coupling of said countershaft to said differential carrier comprising said hollow countershaft, an output gear drivingly attached to said countershaft and meshing constantly with reduction gear means for providing a drive input to said differential carrier at a substantially lesser rate of speed than said countershaft.

* * * * *